UNITED STATES PATENT OFFICE.

L. O. P. MEYER, OF NEWTOWN, CONNECTICUT.

IMPROVEMENT IN VULCANIZING INDIA-RUBBER AND OTHER GUMS.

Specification forming part of Letters Patent No. 10,586, dated February 28, 1854.

*To all whom it may concern:*

Be it known that I, L. OTTO P. MEYER, a native of Hamburg, Germany, but now residing in Newtown, in the State of Connecticut, have invented a certain new and useful Improvement in the Manufacture of Caoutchouc and other Vulcanizable Gums; and I do hereby declare the following to be a full, clear, and exact description thereof.

The nature of my invention consists in heating or curing the material commonly known as the "hard compound of vulcanized caoutchouc or gutta-percha," or other vulcanizable gums, (which may be manufactured according to the processes described in Letters Patent of the United States, granted to Chas. Goodyear on the 15th June, 1844, and to Nelson Goodyear, May 6, 1851,) by heating or curing the material while immersed in a liquid—as, for instance, water.

I have found by many experiments that when it is attempted to cure or heat sheets or masses of the said hard compound or variety of vulcanized gum in hot air or steam there is great danger of the burning or explosion of the material, and the danger of burning or explosion increases with the thickness of the sheets or masses of the material or hard compound which it is desired to heat or cure. It has been hitherto almost impossible to heat or cure sheets or masses of hard compound more than half an inch in thickness; but by means of my improved method sheets or masses of much greater thickness may be cured with safety and certainty.

In order to enable persons skilled in the manufacture of vulcanized caoutchouc, &c., to put in operation my said invention, I proceed to state that the prepared material or compound being in what is called its "green or uncured state" is placed in a vessel wholly or partly filled with some suitable liquid—say water—the material being completely immersed in and covered by the water. The vessel containing the material is then placed in the hot-air or steam heater, and the heat in the heater raised to about 300° Fahrenheit, and the material is cured while thus immersed in the heated water. The water in which the rubber is contained is thus raised to 300° Fahrenheit, and the pressure of the surrounding steam prevents it from vaporizing.

Having thus described the nature of my invention and the method of putting it into operation, what I claim as my invention, and desire to secure by Letters Patent, is—

The heating or curing of the material commonly known as the "hard compound of vulcanized caoutchouc or other vulcanizable gums" by means of the immersion of the material in or under water, or other suitable liquid during the process of heating or curing, substantially as herein described.

L. OTTO P. MEYER.

Witnesses:
C. POPPENHEISER,
WM. H. BISHOP.